US010789474B2

(12) United States Patent
Li et al.

(10) Patent No.: US 10,789,474 B2
(45) Date of Patent: Sep. 29, 2020

(54) SYSTEM, METHOD AND APPARATUS FOR DISPLAYING INFORMATION

(71) Applicant: BAIDU ONLINE NETWORK TECHNOLOGY (BEIJING) CO., LTD., Beijing (CN)

(72) Inventors: Yingchao Li, Beijing (CN); Zuncheng Yang, Beijing (CN); Min Sheng, Beijing (CN); Zhongqin Wu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/175,602

(22) Filed: Oct. 30, 2018

(65) Prior Publication Data

US 2019/0272428 A1 Sep. 5, 2019

(30) Foreign Application Priority Data

Jan. 26, 2018 (CN) .......................... 2018 1 0077780

(51) Int. Cl.
*G06K 9/00* (2006.01)
*G06K 9/32* (2006.01)
(Continued)

(52) U.S. Cl.
CPC ......... *G06K 9/00671* (2013.01); *G06K 9/325* (2013.01); *G06K 9/6215* (2013.01); *G06T 11/60* (2013.01)

(58) Field of Classification Search
CPC .... G06F 16/438; G06F 16/958; G06F 17/227; G06F 17/24; G06F 16/2228; G06F 16/50;
(Continued)

(56) References Cited

U.S. PATENT DOCUMENTS 8,234,168 B1 * 7/2012 Lagle Ruiz ........ G06Q 30/0267
705/14.64
8,392,538 B1 * 3/2013 Lee ........................ G06Q 30/00
709/219
(Continued)

FOREIGN PATENT DOCUMENTS

CN      102402568 A    4/2012
CN      106126067 A    11/2016

OTHER PUBLICATIONS

Wang et al., "Content-based image indexing and searching using Daubechies' wavelets," Int J Digit Libr (1997) 1:311-328 (Year: 1997)*

*Primary Examiner* — Jason A Pringle-Parker
(74) *Attorney, Agent, or Firm* — Marshall, Gerstein & Borun LLP

(57) ABSTRACT

Embodiments of the disclosure disclose a system, method and apparatus for displaying information. A specific embodiment of the method comprises: acquiring currently displayed information, the currently displayed information including an image; associating an augmented reality AR display identifier with the currently displayed information, in response to a preset object in a preset object set existing in the image; displaying the image associated with an AR play identifier, in response to receiving a request for browsing the currently displayed information associated with the AR display identifier from a user; acquiring AR image data of the preset object existing in the image from a server, in response to receiving a request for browsing the image associated with the AR play identifier from the user; and displaying an AR image of the preset object existing in the image based on the AR image data of the preset object existing in the image.

15 Claims, 6 Drawing Sheets

(51) Int. Cl.
*G06K 9/62* (2006.01)
*G06T 11/60* (2006.01)

(58) Field of Classification Search
CPC ....... G06F 16/58; G06F 16/972; G06Q 30/00; G06Q 30/02; G06Q 30/0267; G06Q 30/0641; G06Q 30/0241; G06Q 50/01; G06T 19/006; G06T 13/80; G06T 11/60; H04L 67/02; H04L 67/10; G06K 9/325; G06K 9/6215
USPC ....................................................... 345/633
See application file for complete search history.

(56) References Cited

U.S. PATENT DOCUMENTS

| | | | | |
|---|---|---|---|---|
| 8,495,489 | B1* | 7/2013 | Everingham | G06Q 50/01 |
| | | | | 707/621 |
| 8,711,176 | B2* | 4/2014 | Douris | H04W 4/21 |
| | | | | 345/633 |
| 9,240,077 | B1* | 1/2016 | Kraft | G06T 19/006 |
| 9,449,343 | B2* | 9/2016 | Mayerle | G06Q 30/0643 |
| 9,652,895 | B2* | 5/2017 | Sumner | G06T 19/006 |
| 9,734,634 | B1* | 8/2017 | Mott | G06T 19/006 |
| 9,996,947 | B2* | 6/2018 | Koga | G06Q 10/0631 |
| 2010/0304788 | A1* | 12/2010 | Mun | H04M 1/72572 |
| | | | | 455/556.1 |
| 2011/0134108 | A1* | 6/2011 | Hertenstein | G06T 19/006 |
| | | | | 345/419 |
| 2011/0208817 | A1* | 8/2011 | Toledano | H04W 4/026 |
| | | | | 709/206 |
| 2011/0242133 | A1* | 10/2011 | Greaves | G06F 16/44 |
| | | | | 345/633 |
| 2012/0062595 | A1 | 3/2012 | Oh et al. | |
| 2012/0177297 | A1* | 7/2012 | Everingham | G06K 9/325 |
| | | | | 382/229 |
| 2012/0310749 | A1* | 12/2012 | Everingham | G06Q 30/02 |
| | | | | 705/14.72 |
| 2013/0086112 | A1* | 4/2013 | Everingham | G06Q 30/0641 |
| | | | | 707/780 |
| 2013/0089273 | A1* | 4/2013 | Everingham | G06F 16/58 |
| | | | | 382/305 |
| 2013/0132190 | A1* | 5/2013 | Lagle Ruiz | G06Q 30/0241 |
| | | | | 705/14.49 |
| 2013/0325600 | A1* | 12/2013 | Everingham | G06Q 30/02 |
| | | | | 705/14.49 |
| 2014/0067542 | A1* | 3/2014 | Everingham | G06Q 30/0241 |
| | | | | 705/14.64 |
| 2014/0100997 | A1* | 4/2014 | Mayerle | G06Q 30/0643 |
| | | | | 705/27.2 |
| 2017/0351713 | A1* | 12/2017 | Chamberlain | G06K 9/6202 |

* cited by examiner

SYSTEM, METHOD AND APPARATUS FOR DISPLAYING INFORMATION

CROSS-REFERENCE TO RELATED APPLICATIONS

This application is related to and claims priority from Chinese Application No. 201810077780.8, filed on Jan. 26, 2018 and entitled "System, Method and Apparatus for Displaying Information," the entire disclosure of which is hereby incorporated by reference.

TECHNICAL FIELD

Embodiments of the disclosure relate to the field of computer technology, specifically to the field of image processing, and more specifically to a system, method, and apparatus for displaying information.

BACKGROUND

With the technical progress, the media forms are becoming more and more abundant and diversified, and the various restrictions on the transmission of traditional information, such as images, texts, and videos, have been broken accordingly. Taking the traditional image as an example, the viewing angle on the traditional image cannot be changed. The users can only passively accept the arrangement of the creator. Even if there are occasional switches, the users still fail to freely change the viewing angle. For another example, the content of the traditional image is limited to fixed time and space in production, and cannot be directly associated with the time and space of the user. At present, driven by a series of emerging technologies, such as Augmented Reality (AR), the users can more freely adjust the viewing angle based on their subjective preferences using a device and some special interbehaviors, or simulate the time and space of the content, or project the content into the current space and be directly involved in the content, to obtain more personalized experiences.

The existing approach for displaying information generally displays information in a fixed format. Taking the image as an example, the image is displayed in the traditional image format or displayed in the AR image format.

SUMMARY

Embodiments of the disclosure present a system, method and apparatus for displaying information.

In a first aspect, an embodiment of the disclosure provides a system for displaying information. The system includes: a terminal device and a server. The terminal device is for acquiring currently displayed information, the currently displayed information including an image; associating an augmented reality AR display identifier with the currently displayed information, in response to a preset object in a preset object set existing in the image; displaying the image associated with an AR play identifier, in response to receiving a request for browsing the currently displayed information associated with the AR display identifier from a user; and sending a request for acquiring AR image data of the preset object existing in the image to the server, in response to receiving a request for browsing the image associated with the AR play identifier from the user. The server is for finding the AR image data of the preset object existing in the image from the AR image data of the preset object in the preset object set, and sending the AR image data of the preset object existing in the image to the terminal device. The terminal device is for displaying an AR image of the preset object existing in the image based on the AR image data of the preset object existing in the image.

In some embodiments, at least one of the terminal device or the server is further for: recognizing the image using an image recognition technology, to determine whether the preset object in the preset object set exists in the image.

In some embodiments, at least one of the terminal device or the server is further for: calculating a matching degree between the image and a preset image in a preset image set, where the preset object in the preset object set exists in the preset image in the preset image set; and determining, in response to determining the matching degree between the image and the preset image in the preset image set being greater than a preset matching degree threshold, the preset object in the preset object set existing in the image, and a preset object existing in the preset image with the matching degree greater than the preset matching degree threshold being the preset object existing in the image.

In some embodiments, the server is further for: recognizing text information present in the image; calculating an association degree between the text information present in the image and the preset object in the preset object set; and determining, in response to determining the association degree between the text information present in the image and the preset object in the preset object set being greater than a preset association degree threshold, the preset object in the preset object set existing in the image, and a preset object existing in the preset image with the association degree greater than the preset association degree threshold being the preset object existing in the image.

In some embodiments, the terminal device is further for: recognizing the image using the image recognition technology to obtain a first recognition result, where the first recognition result includes a first confidence level of each preset object in the preset object set existing in the image; the server is further for: recognizing the image using the image recognition technology to obtain a second recognition result, where the second recognition result includes a second confidence level of each preset object in the preset object set existing in the image; and the terminal device is further for: analyzing the first recognition result and the second recognition result, to determine whether the preset object in the preset object set exists in the image.

In some embodiments, the terminal device or the server is further for: associating the AR play identifier with the image to generate the image associated with the AR play identifier, in response to the preset object in the preset object set existing in the image.

In some embodiments, the terminal device or the server is further for: integrating the AR play identifier and the image; or covering the AR play identifier on the image at a preset position.

In a second aspect, an embodiment of the disclosure provides a method for displaying information. The method includes: acquiring currently displayed information, the currently displayed information including an image; associating an augmented reality AR display identifier with the currently displayed information, in response to a preset object in a preset object set existing in the image; displaying the image associated with an AR play identifier, in response to receiving a request for browsing the currently displayed information associated with the AR display identifier from a user; acquiring AR image data of the preset object existing in the image from a server, in response to receiving a request for browsing the image associated with the AR play identifier from the user; and displaying an AR image of the preset object existing in the image based on the AR image data of the preset object existing in the image.

In some embodiments, the method further includes: recognizing the image using an image recognition technology, to determine whether the preset object in the preset object set exists in the image.

In some embodiments, the recognizing the image using an image recognition technology, to determine whether the preset object in the preset object set exists in the image includes: calculating a matching degree between the image and a preset image in a preset image set, where the preset object in the preset object set exists in the preset image in the preset image set; and determining, in response to determining the matching degree between the image and the preset image in the preset image set being greater than a preset matching degree threshold, the preset object in the preset object set existing in the image, and a preset object existing in the preset image with the matching degree greater than the preset matching degree threshold being the preset object existing in the image.

In some embodiments, the method further includes: associating the AR play identifier with the image to generate the image associated with the AR play identifier, in response to the preset object in the preset object set existing in the image.

In some embodiments, the associating the AR play identifier with the image includes: integrating the AR play identifier and the image; or covering the AR play identifier on the image at a preset position.

In a third aspect, an embodiment of the disclosure provides an apparatus for displaying information. The apparatus includes: a first acquisition unit configured for acquiring currently displayed information, the currently displayed information including an image; an association unit configured for associating an augmented reality AR display identifier with the currently displayed information, in response to a preset object in a preset object set existing in the image; a first display unit configured for displaying the image associated with an AR play identifier, in response to receiving a request for browsing the currently displayed information associated with the AR display identifier from a user; a second acquisition unit configured for acquiring AR image data of the preset object existing in the image from the server, in response to receiving a request for browsing the image associated with the AR play identifier from the user; and a second display unit configured for displaying an AR image of the preset object existing in the image based on the AR image data of the preset object existing in the image.

In some embodiments, the apparatus further includes: a determining unit configured for recognizing the image using an image recognition technology, to determine whether the preset object in the preset object set exists in the image.

In some embodiments, the determining unit is further configured for: calculating a matching degree between the image and a preset image in the preset image set, where the preset object in the preset object set exists in the preset image in the preset image set; and determining, in response to determining the matching degree between the image and the preset image in the preset image set being greater than a preset matching degree threshold, the preset object in the preset object set existing in the image, and a preset object existing in the preset image with the matching degree greater than the preset matching degree threshold being the preset object existing in the image.

In some embodiments, the apparatus further includes: a generation unit configured for associating the AR play identifier with the image to generate the image associated with the AR play identifier, in response to the preset object in the preset object set existing in the image.

In some embodiments, the generation unit is further configured for: integrating the AR play identifier and the image; or covering the AR play identifier on the image at a preset position.

In a fourth aspect, an embodiment of the disclosure provides an electronic device, the electronic device including: one or more processors; and a memory for storing one or more programs. The one or more programs enable, when executed by the one or more processors, the one or more processors to implement the method according to the implementation in the second aspect.

In a fifth aspect, an embodiment of the disclosure provides a computer readable storage medium storing a computer program therein. The computer program implements, when executed by a processor, the method according to the implementation in the second aspect.

According to the system, method and apparatus for displaying information provided by the embodiments of the disclosure, first, a terminal device acquires currently displayed information including an image, associates an AR display identifier with the currently displayed information when a preset object in a preset object set exists in the image, displays the image associated with an AR play identifier when receiving a request for browsing the currently displayed information associated with the AR display identifier from a user, and sends a request for acquiring AR image data of the preset object existing in the image to a server when receiving a request for browsing the image associated with the AR play identifier from the user; then the server finds the AR image data of the preset object existing in the image from the AR image data of the preset object in the preset object set, and sends the AR image data of the preset object existing in the image to the terminal device; and finally the terminal device displays an AR image of the preset object existing in the image based on the AR image data of the preset object existing in the image. If the user does not send the request for browsing the image associated with the AR play identifier, the image is displayed in an original format, while if the user sends the request for browsing the image associated with the AR play identifier, the image is displayed in an AR image format, thereby improving the degree of freedom in displaying an image.

BRIEF DESCRIPTION OF THE DRAWINGS

By reading and referring to detailed description on the non-limiting embodiments in the following accompanying drawings, other features, objects and advantages of the disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
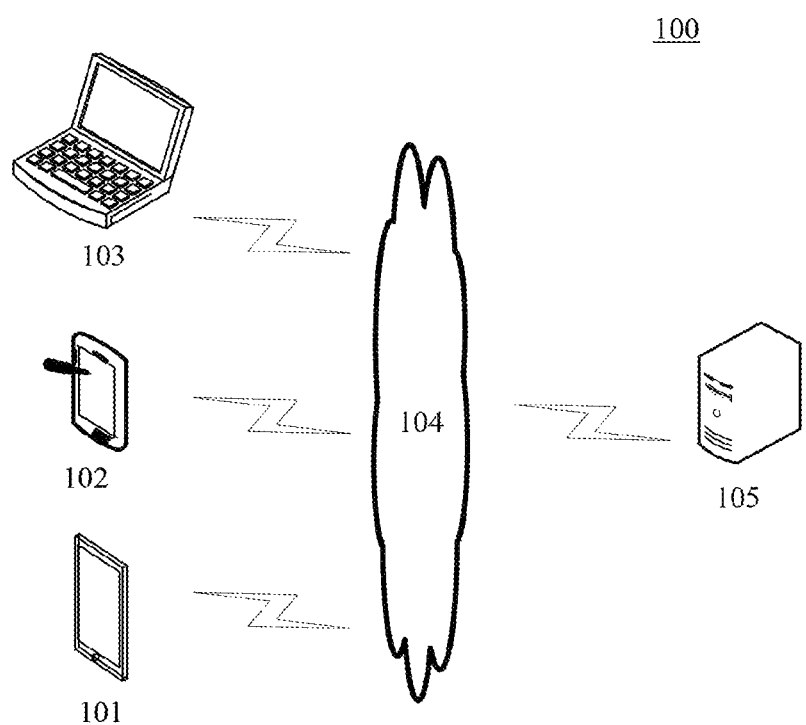
FIG. 1 is an architectural diagram of a system in which some embodiments of the present disclosure may be implemented.

FIG. 1 shows an architecture of an exemplary system 100 in which the system for displaying information according to the embodiments of the present disclosure may be implemented.

As shown in FIG. 1, the system architecture 100 may include terminal devices 101, 102 and 103, a network 104 and a server 105. The network 104 serves as a medium providing a communication link between the terminal devices 101, 102 and 103, and the server 105. The network 104 may include various types of connections, such as wired or wireless transmission links, or optical fibers.

The user may use the terminal devices 101, 102 and 103 to interact with the server 105 through the network 104, to transmit or receive messages, etc. Various communication client applications, such as information browsing applications or search applications may be installed on the terminal devices 101, 102 and 103.

The terminal devices 101, 102 and 103 may be various electronic devices having display screens and supporting information browsing, including but not limited to, smart phones, tablet computers, e-book readers, and computers.

The server 105 may be a server providing various services, for example, the server 105 may be a cloud server storing the AR image data of the preset object in the preset object set. The cloud server may find the AR image data of the preset object existing in the image from the locally stored AR image data of the preset object in the preset object set when receiving a request for acquiring AR image data of the preset object existing in the image in the currently displayed information sent by the terminal devices 101, 102 and 103, and send the found the AR image data to the terminal devices so that the terminal devices 101, 102 and 103 display an AR image of the preset object existing in the image.

It should be noted that the method for displaying information according to the embodiments of the present disclosure is generally executed by the terminal devices 101, 102 or 103. Accordingly, the apparatus for displaying information is generally installed on the terminal devices 101, 102 or 103.

It should be appreciated that the numbers of the terminal devices, the networks and the servers in FIG. 1 are merely illustrative. Any number of terminal devices, networks and servers may be provided based on the actual requirements.

Figure 2:
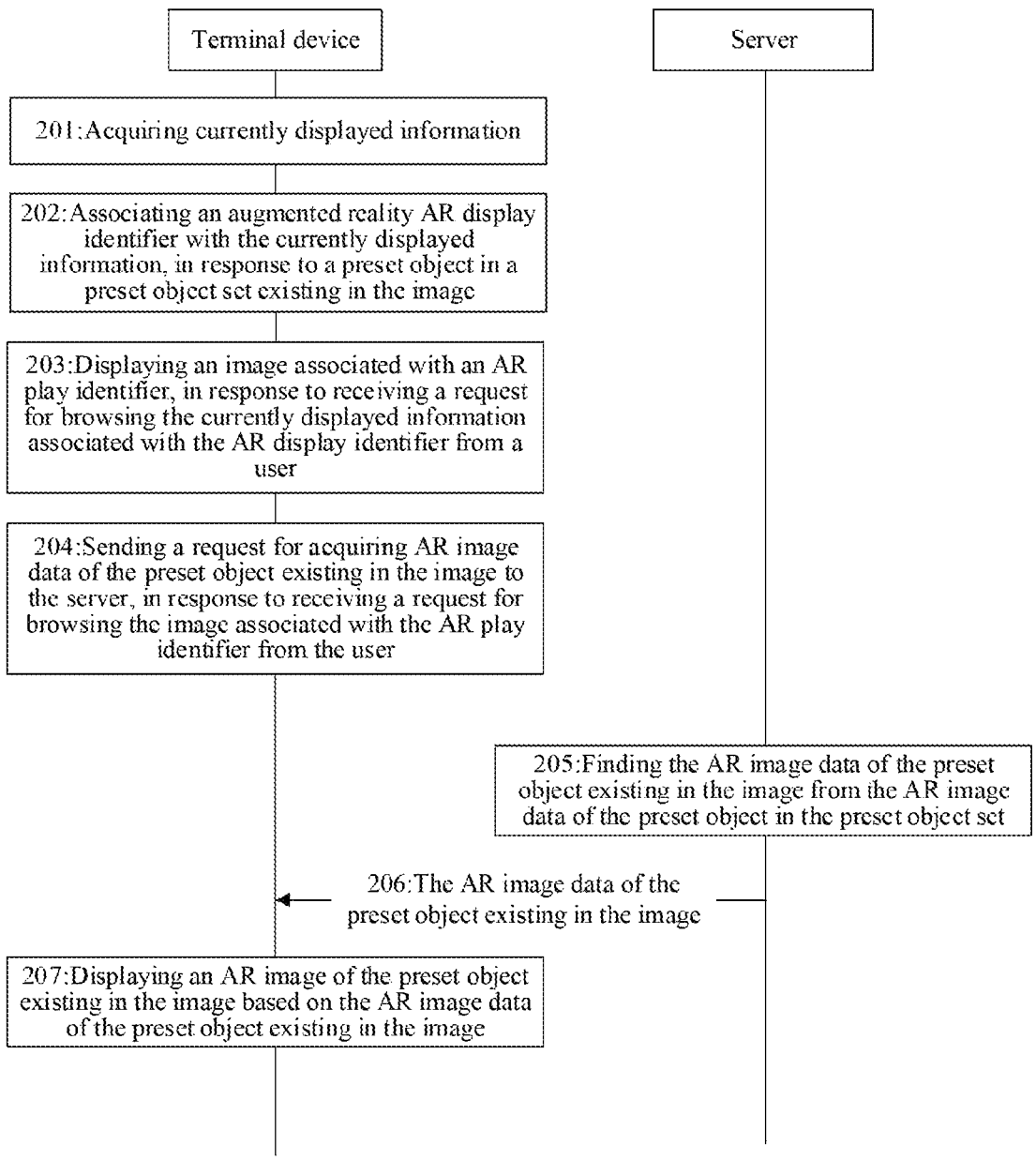
FIG. 2 is a sequence diagram of an embodiment of a system for displaying information according to the disclosure.

Please further refer to FIG. 2, FIG. 2 shows a sequence 200 of an embodiment of a system for displaying information according to the disclosure.

The system for displaying information according to an embodiment of the disclosure may include: a terminal device (e.g., the terminal device 101, 102 or 103 shown in FIG. 1) and a server (e.g., the server 105 shown in FIG. 1). The terminal device is used for acquiring currently displayed information, the currently displayed information including an image; associating an augmented reality AR display identifier with the currently displayed information, in response to a preset object in a preset object set existing in the image; displaying the image associated with an AR play identifier, in response to receiving a request for browsing the currently displayed information associated with the AR display identifier from a user; and sending a request for acquiring AR image data of the preset object existing in the image to the server, in response to receiving a request for browsing the image associated with the AR play identifier from the user. The server is used for finding the AR image data of the preset object existing in the image from the AR image data of the preset object in the preset object set, and sending the AR image data of the preset object existing in the image to the terminal device. The terminal device is used for displaying an AR image of the preset object existing in the image based on the AR image data of the preset object existing in the image.

As shown in FIG. 2, in step 201, the terminal device acquires currently displayed information.

In the embodiment, the terminal device (e.g., the terminal device 101, 102, or 103 shown in FIG. 1) may acquire currently displayed information on a display screen of the terminal device. The terminal devices may be a variety of electronic devices having display screens and supporting information browsing, including but not limited to smart phones, tablet computers, ebook readers, or computers. The currently displayed information may be information including an image, such as news including an image, an advertisement including an image, encyclopedic information including an image, or pushed information including an image. Here, the image in the currently displayed information may be images of various objects, such as images of various animals, images of various automobiles, images of various flowers, or images of various buildings.

In step 202, the terminal device associates an augmented reality AR display identifier with the currently displayed information, in response to a preset object in a preset object set existing in the image.

Figure 3A:
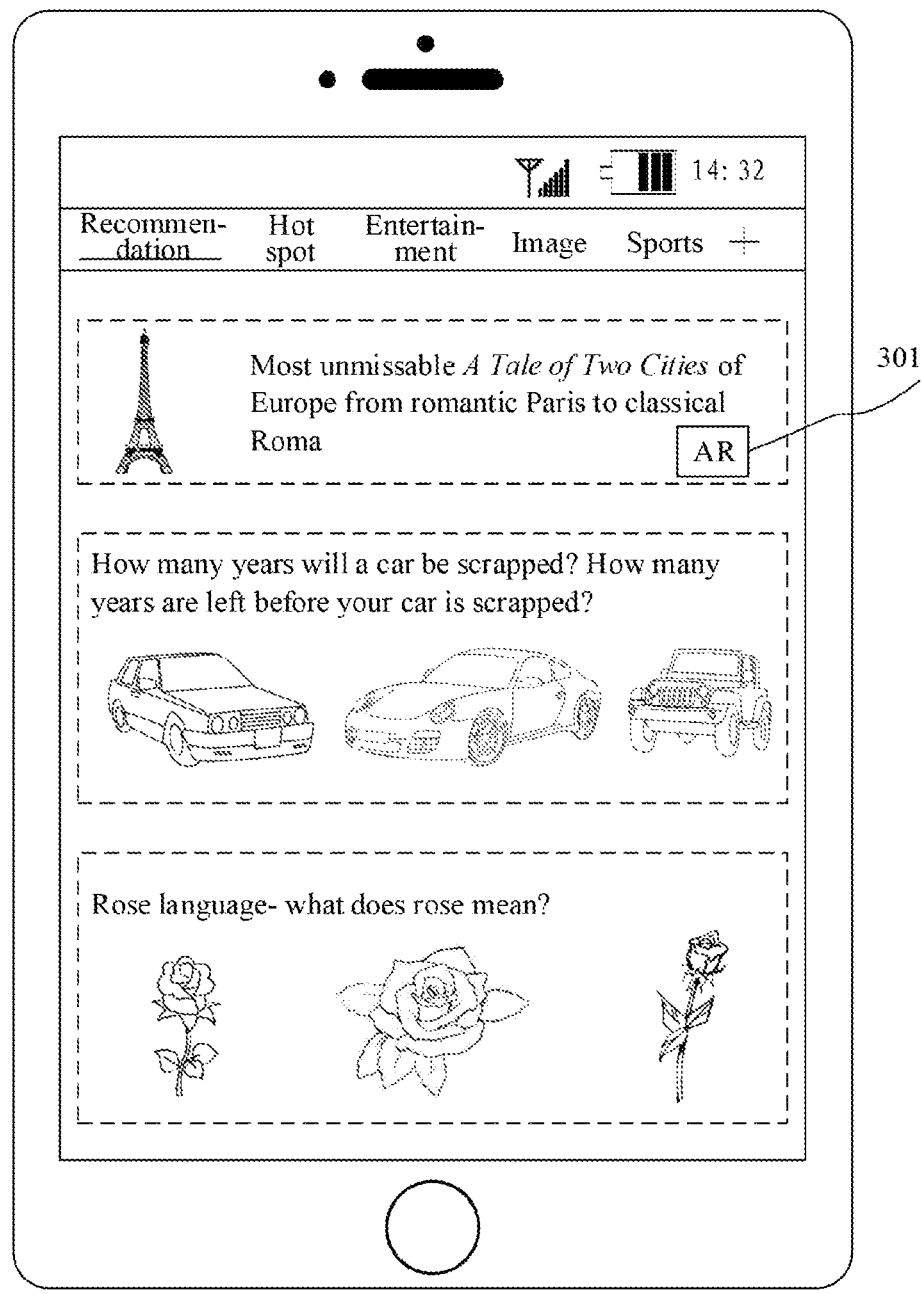
FIG. 3A is a schematic diagram of information associated with an AR display identifier.

In the embodiment, the terminal device may associate an AR display identifier with the currently displayed information, when a preset object in a preset object set exists in the image. The preset object in the preset object set may be a variety of objects preset by a person skilled in the art. For example, a person skilled in the art may pre-collect information associated with the Eiffel Tower, manually generate AR image data of the Eiffel Tower based on the collected information associated with the Eiffel Tower, and add the Eiffel Tower into a preset object set as a preset object. The AR display identifier may be a noun attribute symbol, including at least one of a letter, a number, a symbol, a Chinese character, a pattern, a brand logo, or the like. For example, the AR display identifier may include a rectangular pattern and letters "AR", where the letters "AR" are located inside the rectangular pattern. Specifically, as shown in FIG. 3A, a schematic diagram of information associated with an AR display identifier is shown, where 301 is the AR display identifier.

In the embodiment, the system for displaying information may determine whether the preset object in the preset object set exists in the image using at least one of the terminal device or the server.

In some optional implementations of the embodiment, at least one of the terminal device or the server may recognize the image using an image recognition technology, to determine whether the preset object in the preset object set exists in the image. The image recognition technology is an important approach for the artificial intelligence, and is a technology capable of recognizing various different patterns of targets and objects by object recognition of an image.

As an example, at least one of the terminal device or the server may determine whether the preset object in the preset object set exists in the image by following steps.

First, calculating a matching degree between the image and a preset image in a preset image set.

Specifically, at least one of the terminal device or the server may extract a feature of the image and a feature of the preset image in the preset image set, and calculate a similarity between the feature of the image and the feature of the preset image in the preset image set. The similarity between the feature of the image and the feature of the preset image in the preset image set maybe the matching degree between the image and the preset image in the preset image set. The preset object in the preset object set may exist in the preset image in the preset image set. Generally, there is one-to-one corresponding relationship between the preset image in the preset image set and the preset object in the preset object set, i.e., one preset object in the preset object set exists in one preset image of the preset image set.

Then, comparing the matching degree between the image and the preset image in the preset image set with a preset matching degree threshold, and determining whether the preset object in the preset object set exists in the image based on the comparison result.

Specifically, if the matching degree between the image and any preset image in the preset image set is less than or equal to the preset matching degree threshold, then it is determined that no preset object in the preset object set exists in the image. If the matching degree between the image and a preset image in the preset image set is greater than the preset matching degree threshold, then it is determined that the preset object in the preset object set exists in the image, and a preset object existing in the preset image with the matching degree greater than the preset matching degree threshold is determined as the preset object existing in the image.

As another example, the server may determine whether the preset object in the preset object set exists in the image when text information describing the object in the image is present in the image by following steps.

First, recognizing text information present in the image.

Then, calculating an association degree between the text information present in the image and the preset object in the preset object set.

Here, the server may calculate a conformity degree between the text information present in the image and descriptive information of the preset object in the preset object set. The conformity degree between the text information present in the image and the descriptive information of the preset object in the preset object set may be the association degree between the text information present in the image and the preset object in the preset object set.

Finally, comparing the association degree between the text information present in the image and the preset object in the preset object set with a preset association degree threshold, and determining whether the preset object in the preset object set exists in the image based on the comparison result.

Specifically, if the association degree between the text information present in the image and any preset object in the preset object set is less than or equal to the preset association degree threshold, then it is determined that no preset object in the preset object set exists in the image. If the association degree between the text information present in the image and a preset object in the preset object set is greater than the preset association degree threshold, then it is determined that the preset object in the preset object set exists in the image, and a preset object existing in the preset image with the association degree greater than the preset association degree threshold it is determined as the preset object existing in the image.

As another example, the terminal device and the server may determine whether the preset object in the preset object set exists in the image by following steps.

First, the terminal device recognizes the image using the image recognition technology to obtain a first recognition result; and the server recognizes the image using the image recognition technology to obtain a second recognition result.

The first recognition result may include a first confidence level of each preset object in the preset object set existing in the image. The first confidence level of the each preset object may be used for characterizing a likelihood or probability of the each preset object existing in the image recognized by the terminal device. The second recognition result may include a second confidence level of each preset object in the preset object set existing in the image. The second confidence level of the each preset object may be used for characterizing a likelihood or probability of the each preset object existing in the image recognized by the server.

Then, the server sends the second recognition result to the terminal device.

Finally, the terminal device analyzes the first recognition result and the second recognition result, to determine whether the preset object in the preset object set exists in the image.

Here, the terminal device may select an recognition result from the first recognition result and the second recognition result (for example, select a first obtained recognition result), and determine whether the preset object in the preset object set exists in the image based on the selected recognition result. The terminal device may further integrate the first recognition result and the second recognition result, and determine whether the preset object in the preset object set exists in the image based on the integrated recognition result.

It should be noted that, the terminal device may further send the first recognition result to the server, so that the server determines whether the preset object in the preset object set exists in the image.

In step 203, the terminal device displays an image associated with an AR play identifier, in response to receiving a request for browsing the currently displayed information associated with the AR display identifier from a user.

Figure 3B:
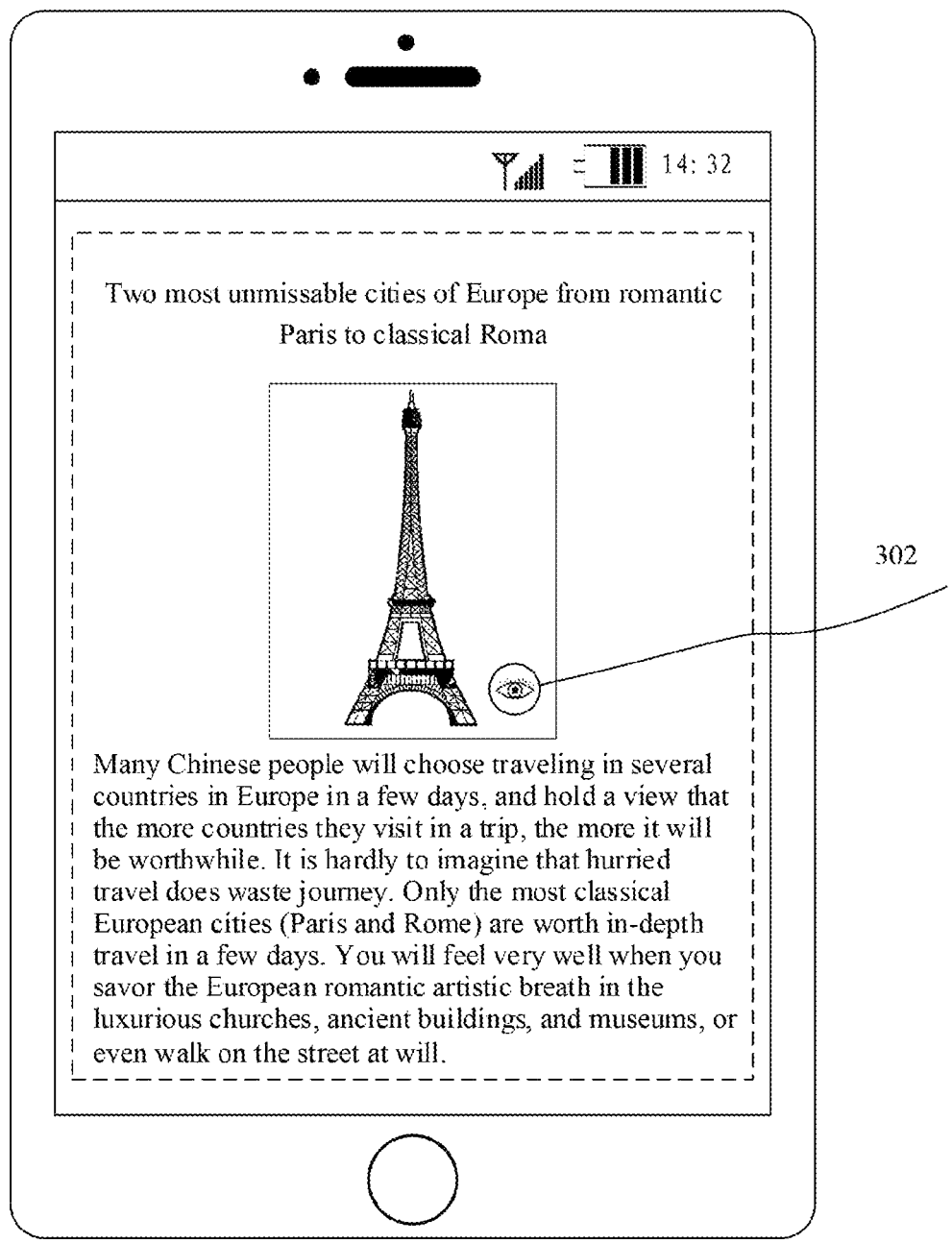
FIG. 3B is a schematic diagram of an image associated with an AR play identifier.

In the embodiment, the terminal device may display the image associated with an AR play identifier, when receiving a request for browsing the currently displayed information associated with the AR display identifier from a user. Here, the user may send a request for browsing the currently displayed information associated with the AR display identifier to the terminal device by executing an operation, such as touch, click, or double click, on the currently displayed information associated with the AR display identifier. The AR play identifier may be a verb attribute symbol, including at least one of a letter, a number, a symbol, a Chinese character, a pattern, a brand logo, or the like. For example, the AR play identifier may include a round pattern and an eye pattern, where the eye pattern is located inside the round pattern. Specifically, as shown in FIG. 3B, a schematic diagram of an image associated with an AR play identifier is shown, where 302 is the AR play identifier.

In the embodiment, the system for displaying information may generate the image associated with the AR play identifier by the terminal device or the server. Specifically, the terminal device or the server may associate the AR play identifier with the image to generate the image associated with the AR play identifier, when the preset object in the preset object set exists in the image. For example, the AR play identifier and the image are integrated; or the AR play identifier is covered on the image at a preset position (e.g., at the center of the image, at the bottom right corner of the image, or at the top left corner of the image).

In step 204, the terminal device sends a request for acquiring AR image data of the preset object existing in the image to the server, in response to receiving a request for browsing the image associated with the AR play identifier from the user.

In the embodiment, the terminal device may send a request for acquiring AR image data of the preset object existing in the image to the server, in response to receiving a request for browsing the image associated with the AR play identifier from the user. Here, the user may send a request for acquiring the AR image data of the preset object existing in the image to the terminal device by executing an operation, such as touch, click, or double click, on the AR play identifier on the image. The terminal device may also be a variety of electronic devices having an AR function, including but not limited to smart phones having the AR function, tablet computers having the AR function, e-book readers having the AR function, computers having the AR function, and so on. The AR image data of an object may include data for constructing a three-dimensional model of the object and data for rendering the three-dimensional model of the object.

In step 205, the server finds the AR image data of the preset object existing in the image from the AR image data of the preset object in the preset object set.

In the embodiment, the server may find the AR image data of the preset object existing in the image from the AR image data of the preset object in the preset object set, when receiving a request for acquiring the AR image data of the preset object existing in the image sent by the terminal device. Generally, the request for acquiring the AR image data of the preset object existing in the image may include an identifier of the preset object existing in the image, and the server may store an identifier of the preset object in the preset object set and the AR image data of the preset object in the preset object set correspondingly. Thus, the server may match the identifier of the preset object existing in the image with the identifier of the preset object in the preset object set. If the identifier of the preset object existing in the image is identical to an identifier of a preset object in the preset object set, then the matching is successful, and the AR image data of the preset object corresponding to the identifier of the successfully matched preset object are acquired.

In step 206, the server sends the AR image data of the preset object existing in the image to the terminal device.

In the embodiment, the server may send the AR image data of the preset object existing in the image to the terminal device when finding the AR image data of the preset object existing in the image.

In step 207, the terminal device displays an AR image of the preset object existing in the image based on the AR image data of the preset object existing in the image.

In the embodiment, the terminal device may construct an AR image of the preset object existing in the image, and display the AR image of the preset object existing in the image based on the AR image data of the preset object existing in the image, when receiving the AR image data of the preset object existing in the image sent by the server. Generally, the AR image data of the object may include data for constructing a three-dimensional model of the object and data for rendering the three-dimensional model of the object. The terminal device may construct the three-dimensional model of the object using the data for constructing the three-dimensional model of the object, then render the three-dimensional model of the object using the data for rendering the three-dimensional model of the object to obtain the AR image of the object, and finally project the AR image of the object into a current space of the user.

According to the system for displaying information provided by the embodiments of the disclosure, first, a terminal device acquires currently displayed information including an image, associates an AR display identifier with the currently displayed information when a preset object in a preset object set exists in the image, displays the image associated with an AR play identifier when receiving a request for browsing the currently displayed information associated with the AR display identifier from a user, and sends a request for acquiring AR image data of the preset object existing in the image to a server when receiving a request for browsing the image associated with the AR play identifier from the user; then the server finds the AR image data of the preset object existing in the image from the AR image data of the preset object in the preset object set, and sends the AR image data of the preset object existing in the image to the terminal device; and finally the terminal device displays an AR image of the preset object existing in the image based on the AR image data of the preset object existing in the image. If the user does not send the request for browsing the image associated with the AR play identifier, the image is displayed in an original format, while if the user sends the request for browsing the image associated with the AR play identifier, the image is displayed in an AR image format, thereby improving the degree of freedom in displaying an image.

Figure 4:
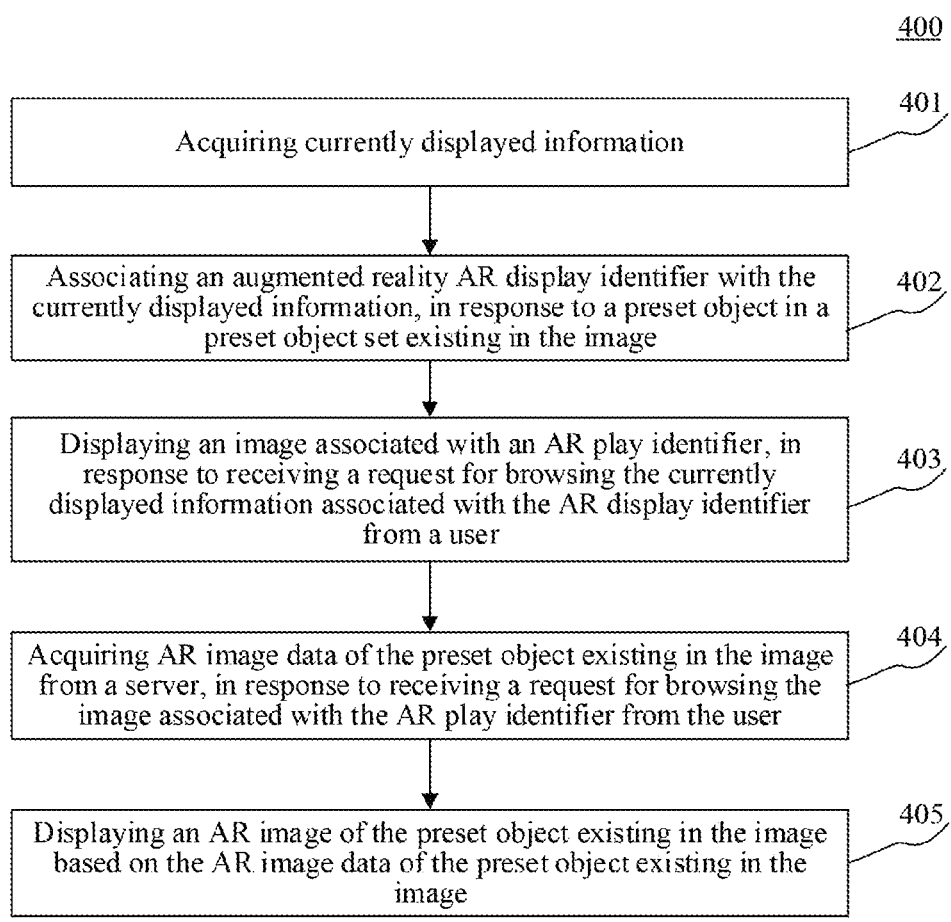
FIG. 4 is a flowchart of an embodiment of a method for displaying information according to the disclosure.

Please further refer to FIG. 4, FIG. 4 shows a flow 400 of an embodiment of a method for displaying information according to the disclosure. The flow 400 of the method for displaying information includes the following steps.

step 401: acquiring currently displayed information.

In the embodiment, a terminal device (e.g., the terminal device 101, 102, or 103 shown in FIG. 1) in which the method for displaying information is performed may acquire currently displayed information on a display screen of the terminal device. The terminal devices may be a variety of electronic devices having display screens and supporting information browsing, including but not limited to smart phones, tablet computers, ebook readers, or computers. The currently displayed information may be information including an image, such as news including an image, an advertisement including an image, encyclopedic information including an image, or pushed information including an image. Here, the image in the currently displayed information may be images of various objects, such as images of various animals, images of various automobiles, images of various flowers, or images of various buildings.

step 402: associating an augmented reality AR display identifier with the currently displayed information, in response to a preset object in a preset object set existing in the image.

In the embodiment, the terminal device may associate an AR display identifier with the currently displayed information, when a preset object in a preset object set exists in the image. The preset object in the preset object set may be a variety of objects preset by a person skilled in the art. For example, a person skilled in the art may pre-collect information associated with the Eiffel Tower, manually generate AR image data of the Eiffel Tower based on the collected information associated with the Eiffel Tower, and add the Eiffel Tower into a preset object set as a preset object. The AR display identifier may be a noun attribute symbol, including at least one of a letter, a number, a symbol, a Chinese character, a pattern, a brand logo, or the like.

In some optional implementations of the embodiment, the terminal device may identify the image using an image recognition technology, to determine whether the preset object in the preset object set exists in the image. The image recognition technology is an important approach for the artificial intelligence, and is a technology capable of recognizing various different patterns of targets and objects by object recognition of an image.

As another example, the terminal device may determine whether the preset object in the preset object set exists in the image by following steps.

First, calculating a matching degree between the image and a preset image in a preset image set.

Specifically, the terminal device may extract a feature of the image and a feature of the preset image in the preset image set, and calculate a similarity between the feature of the image and the feature of the preset image in the preset image set. The similarity between the feature of the image and the feature of the preset image in the preset image set may be the matching degree between the image and the preset image in the preset image set. The preset object in the preset object set may exist in the preset image in the preset image set. Generally, there is one-to-one corresponding relationship between the preset image in the preset image set and the preset object in the preset object set, i.e., one preset object in the preset object set exists in one preset image of the preset image set.

Then, comparing the matching degree between the image and the preset image in the preset image set with a preset matching degree threshold, and determining whether the preset object in the preset object set exists in the image based on the comparison result.

Specifically, if the matching degree between the image and any preset image in the preset image set is less than or equal to the preset matching degree threshold, then it is determined that no preset object in the preset object set exists in the image. If the matching degree between the image and a preset image in the preset image set is greater than the preset matching degree threshold, then it is determined that the preset object in the preset object set exists in the image, and a preset object existing in the preset image with the matching degree greater than the preset matching degree threshold is determined as the preset object existing in the image.

step 403: displaying an image associated with an AR play identifier, in response to receiving a request for browsing the currently displayed information associated with the AR display identifier from a user.

In the embodiment, the terminal device may display the image associated with an AR play identifier, when receiving a request for browsing the currently displayed information associated with the AR display identifier from a user. Here, the user may send a request for browsing the currently displayed information associated with the AR display identifier to the terminal device by executing an operation, such as touch, click, or double click, on the currently displayed information associated with the AR display identifier. The AR play identifier may be a verb attribute symbol, including at least one of a letter, a number, a symbol, a Chinese character, a pattern, a brand logo, or the like.

In some optional implementations of the embodiment, the terminal device may associate the AR play identifier with the image to generate the image associated with the AR play identifier, when the preset object in the preset object set exists in the image. For example, the AR play identifier and the image are integrated; or the AR play identifier is covered on the image at a preset position (e.g., at the center of the image, at the bottom right corner of the image, or at the top left corner of the image).

step 404: acquiring AR image data of the preset object existing in the image from a server, in response to receiving a request for browsing the image associated with the AR play identifier from the user.

In the embodiment, the terminal device may acquire AR image data of the preset object existing in the image from a server (e.g., the server 105 shown in FIG. 1), in response to receiving a request for browsing the image associated with the AR play identifier from the user. Here, the user may send a request for acquiring the AR image data of the preset object existing in the image to the terminal device by executing an operation, such as touch, click, or double click, on the AR play identifier on the image. The terminal device may also be a variety of electronic devices having an AR function, including but not limited to smart phones having the AR function, tablet computers having the AR function, e-book readers having the AR function, computers having the AR function, and so on. The AR image data of an object may include data for constructing a three-dimensional model of the object and data for rendering the three-dimensional model of the object.

Specifically, the terminal device may send a request for acquiring AR image data of the preset object existing in the image to the server, in response to receiving a request for browsing the image associated with the AR play identifier from the user. The server may find the AR image data of the preset object existing in the image from the AR image data of the preset object in the preset object set, and send the AR image data of the preset object existing in the image to the terminal device, when receiving a request for acquiring the AR image data of the preset object existing in the image sent by the terminal device.

step 405: displaying an AR image of the preset object existing in the image based on the AR image data of the preset object existing in the image.

In the embodiment, the terminal device may construct an AR image of the preset object existing in the image, and display the AR image of the preset object existing in the image based on the AR image data of the preset object existing in the image, after acquiring the AR image data of the preset object existing in the image from the server. Generally, the AR image data of the object may include data for constructing a three-dimensional model of the object and data for rendering the three-dimensional model of the object.

The terminal device may construct the three-dimensional model of the object using the data for constructing the three-dimensional model of the object, then render the three-dimensional model of the object using the data for rendering the three-dimensional model of the object to obtain the AR image of the object, and finally project the AR image of the object into a current space of the user.

The method for displaying information provided by the embodiments of the disclosure first acquires currently displayed information including an image; associates an AR display identifier with the currently displayed information when a preset object in a preset object set exists in the image; then displays the image associated with an AR play identifier when receiving a request for browsing the currently displayed information associated with the AR display identifier from a user; then acquires AR image data of the preset object existing in the image from a server when receiving a request for browsing the image associated with the AR play identifier from the user; and finally displays an AR image of the preset object existing in the image based on the AR image data of the preset object existing in the image. If the user does not send the request for browsing the image associated with the AR play identifier, the image is displayed in an original format, while if the user sends the request for browsing the image associated with the AR play identifier, the image is displayed in an AR image format, thereby improving the degree of freedom in displaying an image.

Figure 5:
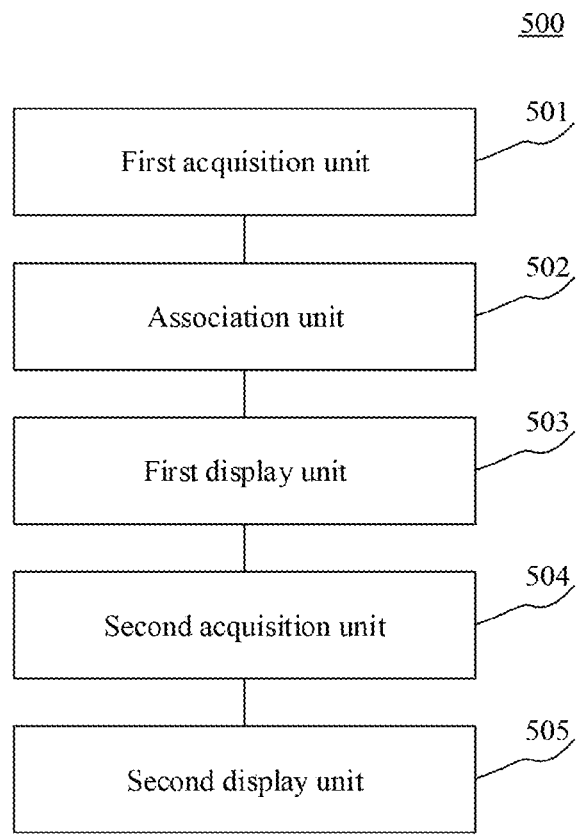
FIG. 5 is a structural schematic diagram of an embodiment of an apparatus for displaying information according to the disclosure.

Please further refer to FIG. 5. As an implementation of the method shown in the above figures, the disclosure provides an embodiment of an apparatus for displaying information. The embodiment of the apparatus corresponds to the embodiment of the method shown in FIG. 4. The apparatus may be specifically applied to a variety of electronic devices.

As shown in FIG. 5, an apparatus 500 for displaying information according to the embodiment may include: a first acquisition unit 501, an association unit 502, a first display unit 503, a second acquisition unit 504, and a second display unit 505. The first acquisition unit 501 is configured for acquiring currently displayed information, the currently displayed information including an image; the association unit 502 is configured for associating an augmented reality AR display identifier with the currently displayed information, in response to a preset object in a preset object set existing in the image; the first display unit 503 is configured for displaying the image associated with an AR play identifier, in response to receiving a request for browsing the currently displayed information associated with the AR display identifier from a user; the second acquisition unit 504 is configured for acquiring AR image data of the preset object existing in the image from the server, in response to receiving a request for browsing the image associated with the AR play identifier from the user; and the second display unit 505 is configured for displaying an AR image of the preset object existing in the image based on the AR image data of the preset object existing in the image.

Relevant description on the steps 401, 402, 403, 404 and 405 in the embodiment corresponding to FIG. 4 may be referred to respectively for specific processing of the first acquisition unit 501, the association unit 502, the first display unit 503, the second acquisition unit 504, and the second display unit 505 of the apparatus 500 for displaying information according to the embodiment and technical effects brought thereby, which are not repeated any more here.

In some optional implementations of the embodiment, the apparatus 500 for displaying information may further include: a determining unit (not shown in the figure) configured for recognizing the image using an image recognition technology, to determine whether the preset object in the preset object set exists in the image.

In some optional implementations of the embodiment, the determining unit may be further configured for: calculating a matching degree between the image and a preset image in a preset image set, where the preset object in the preset object set exists in the preset image in the preset image set; and determining, in response to determining the matching degree between the image and the preset image in the preset image set being greater than a preset matching degree threshold, the preset object in the preset object set existing in the image, and a preset object existing in the preset image with the matching degree greater than the preset matching degree threshold being the preset object existing in the image.

In some optional implementations of the embodiment, the apparatus 500 for displaying information may further include: a generation unit (not shown in the figure) configured for associating the AR play identifier with the image to generate the image associated with the AR play identifier, in response to the preset object in the preset object set existing in the image.

In some optional implementations of the embodiment, the generation unit may be further configured for: integrating the AR play identifier and the image; or covering the AR play identifier on the image at a preset position.

Figure 6:
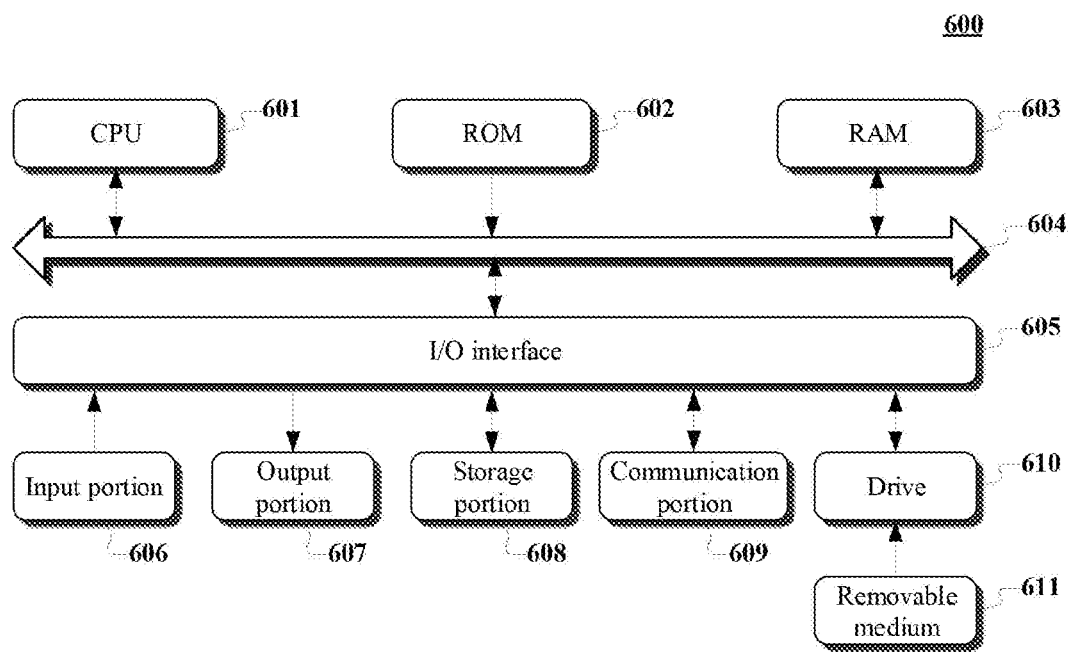
FIG. 6 is a structural schematic diagram of a computer system adapted to implement an electronic device according to an embodiment of the disclosure.

Referring to FIG. 6, a structural schematic diagram of a computer system 600 adapted to implement an electronic device of embodiments of the present disclosure is shown. The electronic device shown in FIG. 6 is merely an example, and should not bring any limitations to the functions and the scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flowcharts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, comprising a first acquisition unit, an association unit, a first display unit, a second acquisition unit, and a second display unit, where the names of these units do not in some cases constitute a limitation to such units themselves. For example, the first acquisition unit may also be described as "a unit for acquiring currently displayed information."

In another aspect, the present disclosure further provides a computer-readable storage medium. The computer-readable storage medium may be the computer storage medium included in the electronic device in the above described embodiments, or a stand-alone computer-readable storage medium not assembled into the electronic device. The computer-readable storage medium stores one or more programs. The one or more programs, when executed by an electronic device, cause the electronic device to: acquiring currently displayed information, the currently displayed information including an image; associating an augmented reality AR display identifier with the currently displayed information, in response to a preset object in a preset object set existing in the image; displaying the image associated with an AR play identifier, in response to receiving a request for browsing the currently displayed information associated with the AR display identifier from a user; acquiring AR image data of the preset object existing in the image from the server, in response to receiving a request for browsing the image associated with the AR play identifier from the user; and displaying an AR image of the preset object existing in the image based on the AR image data of the preset object existing in the image.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:
1. A system for displaying information, comprising:
a terminal device and a server;
(A) wherein the terminal device is configured for:
 (i) acquiring currently displayed information, the currently displayed information including a first image;
 (ii) associating an Augmented Reality (AR) display identifier with the first image in response to determining that a preset object, from a preset object set, exists in the first image;
 (iii) responding to detecting a first user interaction, with the AR display identifier, that represents a request to browse information associated with the preset object included in the first image by: displaying an AR play identifier in conjunction with the first image, the AR play identifier being different from the AR display identifier; and
 (iv) responding to detecting a second user interaction, with the AR play identifier, that represents a request to browse one or more AR images of the preset object by: sending a request for acquiring AR image data of the preset object existing in the first image to the server, the AR image data of the preset object comprising data for constructing a three-dimensional model of the preset object and data for rendering the three-dimensional model of the preset object;

(B) wherein the server is configured for:
(i) finding a relevant set of AR image data representing an identified AR image of the preset object, and
(ii) sending the relevant set of AR image data representing the identifier AR image of the preset object to the terminal device; and (C) wherein the terminal device is further configured for: displaying the identified AR image of the preset object existing in the first image in response to the second user interaction with the AR play identifier displayed in conjunction with the first image.

2. The system according to claim 1, wherein at least one of the terminal device or the server is further configured for:
recognizing the first image using an image recognition technology, to determine whether the preset object from the preset object set exists in the first image.

3. The system according to claim 2, wherein at least one of the terminal device or the server is further configured for:
calculating a matching degree between the first image and a preset image in a preset image set, wherein the preset object from the preset object set exists in the preset image in the preset image set; and
determining, in response to determining the matching degree between the first image and the preset image in the preset image set being greater than a preset matching degree threshold, that the preset object from the preset object set exists in the first image, and a preset object existing in the preset image with the matching degree greater than the preset matching degree threshold is the preset object existing in the first image.

4. The system according to claim 2, wherein the server is further configured for:
recognizing text information present in the first image;
calculating an association degree between the text information present in the first image and the preset object from the preset object set; and
determining, in response to determining the association degree between the text information present in the first image and the preset object in the preset object set being greater than a preset association degree threshold, that the preset object from the preset object set exists in the image, and a preset object existing in the preset image with the association degree greater than the preset association degree threshold is the preset object existing in the image.

5. The system according to claim 2, wherein
the terminal device is further configured for: recognizing the first image using the image recognition technology to obtain a first recognition result, wherein the first recognition result includes a first confidence level of each preset object, from the preset object set, existing in the first image;
the server is further configured for: recognizing the first image using the image recognition technology to obtain a second recognition result, wherein the second recognition result includes a second confidence level of each preset object, from the preset object set, existing in the first image; and
the terminal device is further configured for: analyzing the first recognition result and the second recognition result, to determine whether the preset object from the preset object set exists in the first image.

6. The system according to claim 1, wherein the terminal device or the server is further configured for:
integrating the AR play identifier and the first image; or covering the AR play identifier on the first image at a preset position.

7. A method for displaying information, comprising:
acquiring currently displayed information, the currently displayed information including a first image;
associating an Augmented Reality (AR) display identifier with the first image in response to determining that a preset object, from a preset object set, exists in the first image;
responding to detecting a first user interaction, with the AR display identifier, that represents a request to browse information associated with the preset object included in the first image by: displaying an AR play identifier in conjunction with the first image, the AR play identifier being different from the AR display identifier;
responding to detecting a second user interaction, with the AR play identifier, that represents a request to browse one or more AR images of the preset object by: acquiring AR image data of the preset object existing in the first image from the server, the AR image data of the preset object comprising data for constructing a three-dimensional model of the preset object and data for rendering the three-dimensional model of the preset object; and
displaying an identified AR image of the preset object existing in the first image based on the AR image data of the preset object existing in the first image.

8. The method according to claim 7, the method further comprising:
recognizing the first image using an image recognition technology, to determine whether the preset object from the preset object set exists in the first image.

9. The method according to claim 8, wherein the recognizing the first image using an image recognition technology, to determine whether the preset object from the preset object set exists in the first image comprises:
calculating a matching degree between the first image and a preset image in a preset image set, wherein the preset object from the preset object set exists in the preset image in the preset image set; and determining, in response to determining the matching degree between the first image and the preset image in the preset image set being greater than a preset matching degree threshold, that the preset object from the preset object set exists in the first image, and a preset object existing in the preset image with the matching degree greater than the preset matching degree threshold is the preset object existing in the first image.

10. The method according to claim 7, wherein the associating the AR play identifier with the first image comprises:
integrating the AR play identifier and the first image; or covering the AR play identifier on the first image at a preset position.

11. A non-transitory computer readable storage medium, storing a computer program therein, the computer program, when executed by a processor, implementing the method according to claim 7.

12. An apparatus for displaying information, comprising:
at least one processor; and
a memory storing instructions, the instructions when executed by the at least one processor, cause the at least one processor to perform operations, the operations comprising:

acquiring currently displayed information, the currently displayed information including a first image;

associating an Augmented Reality (AR) display identifier with the first image in response to determining that a preset object, from a preset object set, exists in the first image;

responding to detecting a first user interaction, with the AR display identifier, that represents a request to browse information associated with the preset object included in the first image by: displaying an AR play identifier in conjunction with the first image, the AR play identifier being different from the AR display identifier;

responding to detecting a second user interaction, with the AR play identifier, that represents a request to browse one or more AR images of the preset object by: acquiring AR image data of the preset object existing in the first image from a server, the AR image data of the preset object comprising data for constructing a three-dimensional model of the preset object and data for rendering the three-dimensional model of the preset object; and displaying an identified AR image of the preset object existing in the first image based on the AR image data of the preset object existing in the first image.

13. The apparatus according to claim 12, the operations further comprising:

recognizing the first image using an image recognition technology, to determine whether the preset object from the preset object set exists in the first image.

14. The apparatus according to claim 13, wherein the recognizing the first image using an image recognition technology, to determine whether the preset object from the preset object set exists in the first image comprises:

calculating a matching degree between the first image and a preset image in a preset image set, wherein the preset object from the preset object set exists in the preset image in the preset image set; and determining, in response to determining the matching degree between the first image and the preset image in the preset image set being greater than a preset matching degree threshold, that the preset object from the preset object set exists in the first image, and a preset object existing in the preset image with the matching degree greater than the preset matching degree threshold is the preset object existing in the first image.

15. The apparatus according to claim 12, wherein the associating the AR play identifier with the first image comprises:

integrating the AR play identifier and the first image; or covering the AR play identifier on the first image at a preset position.

* * * * *